3,313,655
PROCESS FOR DEIONIZING SUGAR SOLUTIONS
Akimitsu Miyahara, Iruma-gun, Takaaki Oomagari, Sooka, and Hikoji Tsuchiya, Tokyo, Japan, assignors to Rohm & Haas Company, Philadelphia, Pa., a corporation of Delaware
No Drawing. Filed Dec. 27, 1963, Ser. No. 331,349
4 Claims. (Cl. 127—46)

This invention is an improvement in the deionization of aqueous sugar solutions by means of synthetic cation exchange resins.

It is known that in the processing of both sugar beet and can sugar juices the presence of inorganic salts in sugar solutions interferes with the recovery of the sucrose. It is also known that the salts of different metals have different effects and that the alkaline earth metals such as calcium are much more melassigenic than is sodium. The presence of calcium in refinery solutions is also objectionable for the reason that its salts are primarily responsible for the scale that forms on the evaporators. To overcome these salt effects, it has heretofore been proposed to deionize the defecated raw sugar juice by passing it first through a bed of cation-exchange resin wherein hydrogen ions from the resin are exchanged for the cations of the salt in solution and then through a bed of anion-exchange resin which adsorbs the acid formed in the bed of cation-exchange material.

Usually the juice is passed in this fashion through cation- and anion-exchange beds in series and the salt content of the juice reduced in steps. A disadvantage of this process is that the acidic condition of the syrup leaving the cation-exchange bed is conducive to the inversion of the sucrose. In addition, the regenerated (H+ form) of the cation exchange resin itself serves as an acid heterogeneous catalyst further adding to the inversion problem. To overcome this, the syrup must be reduced to a temperature of approximately 20° C. or even lower, but even this does not completely solve the problem. A further disadvantage of the process is that the high calcium content of the defecated syrup requires that special regenerating techniques be employed for the most economical operation.

The cation exchange materials heretofore used in deionizing sugar solutions, either alone or in mixed beds as just described, have been those that contain strongly acidic polar groups, such as sulfonate or sulfate, as well as those having carboxylic acid radicals as their polar groups.

The sulfonated coals, sulfonated phenol formaldehyde resins, and sulfonated styrene-divinyl benzene copolymers which typify the strongly acid cation exchangers have the power to split neutral salts; i.e., to replace the cations of the salt with hydrogen ions from the exchange material. The carboxylic cation exchangers in their acidic form are weakly acidic in nature and do not split salts to any substantial degree.

Because of the problems encountered with the use of strongly acidic cation exchange resins, the prior art generally has been forced to resort to the less efficient, weakly acidic cation exchangers for sugar purification. The chances of inversion of the sugar, which normally has made the use of the strongly acidic materials prohibitive, are substantially overcome by the use of weakly acidic resins. But at the same time there is a comparable lessening of efficiency in the process, with the result that inorganic cations, nitrogen compounds and other organic impurities are not removed to a sufficiently desirable degree. Because of the inversion problem associated with the use of sulfonic acid cation exchange resins the use of ion exchange in the sugar industry has met with only a very limited acceptance.

All of the disadvantages of these prior art methods have been overcome by the present method which consists in a two-step treatment of sugar solutions, using two different cation exchange resins both of which are in the H+ form. The first is a strongly acidic cation exchange resin which is highly cross-linked, the cross-linking agent being present in amounts ranging from about 10.5% to about 50% of the resin copolymer. The second is a strongly acidic cation exchange resin having a relatively low degree of cross-linkage, the cross-linking agent being present in amounts ranging from about 1% to about 10% of the resin copolymer.

The lower the degree of cross-linking in the cation exchange resin, the greater will be the resin's activity for inverting the sugar by heterogeneous catalysis. This appears to be due to the fact that there is a greater diffusion rate of the sugar through the gel structure of a resin which is less tightly cross-linked. When these relatively low cross-linked cation exchange resins are employed, the danger of inversion causes sugar processors to resort to such expensive measures as cooling the sugar juices from about 60° to about 10° C., then heating the juice up again to 60° or higher after the resin treatment in order to obtain sugar crystals by evaporation.

As pointed out above, even such cooling treatments will not completely eliminate sugar inversion, nor will the use of the less effective carboxylic weakly acidic cation exchange resins. Some improvement in this regard has been obtained in recent years due to the development of highly cross-linked resins. They have the merit of suppressing inversion, apparently due to the fact that there is a relatively lower diffusion rate of the sugar through the resin's gel structure, and this tends to depress the resin's catalytic activity on the sugar. The comparatively recent availability of macroreticular structures having a very high degree of cross-linking permits one to make use of this principle even more effectively. However, highly cross-linked resins are in themselves not entirely satisfactory for sugar purification in that they fail to remove organic cations such as amino acids, and there is a considerable leakage of ash.

Our present invention overcomes all of these described difficulties. By first passing the sugar through the highly cross-linked cation exchange resins a considerable amount of the deionizing job is accomplished, the bulk of the cations such as the ash constituents being removed with negligible inversion taking place. Passage of the sugar through the second, relatively low cross-linked resin unit, serves to remove whatever ash may have leaked by the first resin as well as any of the organic cations such as amino acids which remain. By means of this technique, the sugar is only in contact with the more catalytically active resin for a short period of time, but the period of time is sufficient to permit the complete removal of organic bases. The inversion of sucrose is, therefore, minimized.

In the regeneration phase, the highly cross-linked resin preferably is regenerated with hydrochloric or sulfuric acid. The relatively low cross-linked resin preferably is first treated with an alkali such as ammonia or caustic soda, or a salt such as sodium chloride, or a mixture of both alkali and salt. This treatment serves to elute organic cations, following which the resin may then be regenerated with acid. From this effluent, incidentally, valuable organic cations such as betaine, amino acids and the like can be recovered, if desired.

The highly cross-linked cation exchange resins which are used in the first step are well known and are available commercially in either such conventional non-macroreticular forms as Amberlite IR–122 or Amberlite 124, or the more recent macroreticular structures such as Amberlite 200. The lower cross-linked resins are also commercially available products such as those which are sold under the trademark Amberlite IR–120. All of these products are manufactured and distributed by the Rohm & Haas Company, Philadelphia, Pa.

It should be understood that other, more or less obvious variations of the present invention may be practiced without departing from the spirit and scope thereof. For example, between the first and second steps one may insert a filtration process or a treatment by means of an anion exchange resin. Although these and other refinements might be found desirable for one reason or another, the principal effects accomplished by the present invention's use of a highly cross-linked cation exchange resin followed by a lowly cross-linked cation exchange resin will be experienced in accordance with foregoing teachings.

The present invention will be better understood from a review of the following examples:

EXAMPLE 1

Three 25 liter samples of beet sugar juice taken after the second carbonation process in a sugar refining plant were cooled down to about 15° C., and then were deionized by the following three methods, respectively:

Method A (the present invention)

A first column containing one liter of a strongly acidic cation exchange resin made from styrene and 12.5% divinylbenzene as the cross-linking agent was regenerated by passing two liters of a 5% solution of HCl through the column. The sugar juice was then passed through the column at such a rate that two hours were required for the juice to pass completely through the column.

The sugar solution effluent from the first column next was passed through a second column containing 0.5 liter of a strongly acidic cation exchange resin made from styrene and 8.5% divinylbenzene, this resin likewise having first been regenerated with a liter of 5% HCl. The rate of passage of the sugar solution through the second column was the same as through the first column.

Method B

A column containing 1.7 liters of the same type of resin as in the first column of Method A was regenerated by passing 3.4 liters of a 5% HCl solution therethrough. The sugar juice then was passed through the resin column.

Method C

A column containing 1.7 liters of the same type of resin as in the second column of Method A was regenerated by passing 3.4 liters of a 5% HCl solution therethrough. The sugar juice then was passed through the resin column.

The results are tabulated in Table I below.

TABLE I

| Method | Percent Inorganic Cations Removed | Percent Organic Cations Removed | Increase of Inverted Sugar Quantity, Percent on Solid |
|---|---|---|---|
| A | 97 | 86 | 0.03 |
| B | 95 | 47 | 0.03 |
| C | 95 | 71 | 0.08 |

EXAMPLE 2

Two 25 liter samples of cane sugar juice taken after the phosphate defecation process in a sugar mill are cooled down to about 12° C., and then deionized by the following three methods, respectively:

Method A (the present invention)

A first column containing one liter of a strongly acidic cation exchange resin made from styrene and 12.5% divinyl-benzene as the cross-linking agent is regenerated by passing two liters of a 7% solution of $H_2SO_4$ through the column. The sugar juice is then passed through the column at such a rate that about two hours are required for the juice to pass completely through the column.

The sugar solution effluent from the first column next is passed through a second column containing 0.5 liter of a strongly acidic cation exchange resin made from styrene and 8.5% divinylbenzene, this resin likewise having first been regenerated with a liter of 7% $H_2SO_4$. The rate of passage of the sugar solution through the second column is the same as through the first column.

Method B

A column containing 1.7 liters of a strongly acidic cation exchange resin made from styrene and 12.5% divinylbenzene as the cross-linking agent is regenerated by passing 3.4 liters of a 7% $H_2SO_4$ solution therethrough. The sugar juice then is passed through the resin column.

Method C

A column containing 1.7 liters of a strongly acidic cation exchange resin made from styrene and 8.5% divinylbenzene is employed, this resin likewise having been regenerated with 3.4 liters of a 7% $H_2SO_4$ solution. The sugar juice then is passed through the resin column.

The results obtainable in these procedures may be illustratively represented by the figures in Table II, which follows:

TABLE II

| Method | Percent Inorganic Cations Removed | Percent Organic Cations Removed | Increase of Inverted Sugar Quantity, Percent on Solid |
|---|---|---|---|
| A | 98 | 90 | 0.03 |
| B | 96 | 50 | 0.03 |
| C | 96 | 70 | 0.03 |

Equally satisfactory results are obtained when the degree of cross-linking of the first resin is varied from 10.5 to 50% and used in conjunction with a second resin whose degree of cross-linking is varied from 1 to 10%. In all instances it is clearly apparent that the two-step method of the present invention is far superior to the use of either just a highly cross-linked or just a lowly cross-linked cation exchange resin as per prior art methods. Without any increase in inverted sugar over the results obtained when just the highly cross-linked material is used, results in terms of degree of deionization of the sugar solutions are obtained which even surpass those obtained when just the lowly cross-linked material is employed.

The invention appears to be primarily a function of the relative degree of cross-linking of each of the cation exchange resins used in the two consecutive steps of the process. It is apparently not critical which cross-linking agent is used, or what the polymer backbone is. Even the functional group employed is not a restricted choice, except that it should be one which is strongly acidic. Such cross-linkers may be employed as divinylbenzene, divinyltoluene, trivinylbenzene, divinylnaphthalene, ethylene glycol diacrylate or dimethacarylate, a diacrylate or dimethacrylate or propylene glycol, diethylene glycol, trimethylene glycol, hexamethylene glycol, or the like. In addition there may be employed such cross-linking agents as 1,2-divinyloxyethane, 1,2,3-trivinyloxypropane, 1,4-divinyloxybutane; 1,2-bis(vinylmercapto)ethane; 1,4-bis(vinylmercapto)butane; divinylxylene, divinylethylbenzene, divinyl ether, divinyl sulfone, allyl ethers of polyhydric compounds such as of glycerol, pentaerythritol, resorcinol, etc., divinylketone, divinylsulfide, allyl acrylate, diallyl maleate, diallyl fumarate, diallyl phthalate, diallyl succinate, diallyl carbonate, diallyl malonate, diallyl oxylate, diallyl adipate, diallyl sebacate, diallyl tartrate, diallyl silicate, triallyl tricarballylate, triallyl aconitrate, triallyl citrate, triallyl phosphate, N,N'-methylenediacrylamide, N,N'-ethylidenediacrylamide, 1,2-di(α-methylmethylenesulfonamido) ethylene, and so on.

We claim:

1. The method of purifying a dilute sucrose solution containing dissolved salts which comprises the two essential steps of directing the solution first through a bed of strongly acidic cation exchange resin in which the cross-linking agent is present in amounts ranging from about 10.5% to about 50% of the resin copolymer, and subsequently through a bed of strongly acidic cation exchange resin in which the cross-linking agent is present in amounts ranging from about 1% to about 10%, both resins being in the hydrogen form.

2. The method of claim 1 in which the strongly acidic polar groups in each of the two cation exchange resins are selected from the class consisting of sulfonate and sulfate groups.

3. The method of claim 1 in which the resin having a cross-linking agent in amounts ranging from 10.5% to 50% has a macroreticular structure.

4. A cyclical method for purifying a dilute sucrose solution containing dissolved salts, which comprises the two essential steps of directing the solution first through a bed of strongly acidic cation exchange resin in which the cross-linking agent is present in amounts ranging from about 10.5% to about 50% of the resin copolymer, later passing the effluent from the first bed through a bed of strongly acidic cation exchange resin in which the cross-linking agent is present in amounts ranging from about 1% to about 10%, both resins being in the hydrogen form, then regenerating the more highly cross-linked resin by coursing through that bed a mineral acid from the class consisting of sulfuric and hydrochloric acids, and likewise regenerating the more lowly cross-linked resin by coursing through that bed an organic cation defouling agent from the class consisting of ammonia, caustic soda and sodium chloride, followed by a mineral acid regenerant from the class consisting of hydrochloric and sulfuric acids, the cycle then being repeated by the passing through the two resin beds of more dilute sucrose solution to be purified.

References Cited by the Examiner

UNITED STATES PATENTS

| | | | |
|---|---|---|---|
| 2,649,390 | 8/1953 | Winters et al. | 127—46 |
| 3,073,725 | 1/1963 | Popper et al. | 127—46 |
| 3,090,707 | 5/1963 | Moebes | 127—46 |

MORRIS O. WOLK, *Primary Examiner.*

E. G. WHITBY, *Assistant Examiner.*